(12) United States Patent
Norsworthy et al.

(10) Patent No.: US 12,022,827 B2
(45) Date of Patent: Jul. 2, 2024

(54) COMPOSITIONS AND METHODS TO REDUCE DICAMBA VOLATILITY AND PROVIDE PLANT ESSENTIAL NUTRIENTS

(71) Applicant: THE BOARD OF TRUSTEES OF THE UNIVERSITY OF ARKANSAS, Little Rock, AR (US)

(72) Inventors: Jason Keith Norsworthy, West Fork, AR (US); Trenton Roberts, Fayetteville, AR (US)

(73) Assignee: THE BOARD OF TRUSTEES OF THE UNIVERSITY OF ARKANSAS, Little Rock, AR (US)

( * ) Notice: Subject to any disclaimer, the term of this patent is extended or adjusted under 35 U.S.C. 154(b) by 0 days.

(21) Appl. No.: 17/346,867

(22) Filed: Jun. 14, 2021

(65) Prior Publication Data
US 2021/0298293 A1   Sep. 30, 2021

Related U.S. Application Data

(63) Continuation of application No. PCT/US2020/062780, filed on Dec. 2, 2020.

(60) Provisional application No. 62/942,564, filed on Dec. 2, 2019.

(51) Int. Cl.
*A01N 25/32* (2006.01)
*A01N 37/40* (2006.01)

(52) U.S. Cl.
CPC .............. *A01N 25/32* (2013.01); *A01N 37/40* (2013.01)

(58) Field of Classification Search
CPC .......... A01N 37/40; A01N 25/00; A01N 25/32
USPC ........................................................ 504/324
See application file for complete search history.

(56) References Cited

U.S. PATENT DOCUMENTS

| 5,958,463 | A | 9/1999 | Milne et al. |
| 8,853,246 | B2 | 10/2014 | Trullinger |
| 2010/0331182 | A1 | 12/2010 | Zhang |
| 2014/0128264 | A1 | 5/2014 | Hemminghaus |
| 2014/0245802 | A1 | 9/2014 | Pursell et al. |
| 2014/0249026 | A1 | 9/2014 | Hemminghaus et al. |
| 2015/0157012 | A1* | 6/2015 | Schnabel ............... A01N 25/02 504/324 |

FOREIGN PATENT DOCUMENTS

WO   2016130813 A1   8/2016

OTHER PUBLICATIONS

Cambridge University Press. Multiple Branch and Block Predict Many factors impacting the pH of dicamba spray mixtures When it comes to applying spray mixtures . . . [online], Sep. 11, 2019, [retrieved on Nov. 16, 2021]. Retrieved from the Internet :< URL:https://www.sciencedaily.com/releases/2019/09/190911113023.htm>.*
BASF. Safety Data Sheet. Sentris Buffering Technology Version 2.0. Jan. 25, 2021. 10 pages.
BASF. Sentris Buffering Technology Container Label. 2020. 5 pages.
International Search Report and Written Opinion of International Patent Application No. PCT/US2020/062780 dated Feb. 25, 2021 (9 pages).
Currie, "The environmental advantages of using diffusible preservatives," The second international conference on wood protection with diffusible preservatives and pesticides (presented in Nov. 1996; published in Sep. 1997), pp. 38-40.

* cited by examiner

*Primary Examiner* — Michael B. Pallay
(74) *Attorney, Agent, or Firm* — Quarles & Brady, LLP

(57) ABSTRACT

Compositions and methods to reduce herbicide volatility and provide plant essential nutrients are provided. The composition comprises an effective amount of acidic herbicide, such as dicamba, and an effective amount of borate, where the effective amount of the borate reduces the volatility of the acidic herbicide and wherein the pH of the composition is greater than 5.

20 Claims, 13 Drawing Sheets

FIG. 4

ization injury to a plant outside of the application area may be reduced as compared to application of the acidic herbicide without the borate. In some embodiments, the plant outside of the application area is a herbicide intolerant crop and the herbicide intolerant crop at a distance at least 10 feet from the application area has less than 5% injury.

Another aspect of the invention provides for the increase of boron in a tissue of a crop. The method comprises applying any of the compositions described herein to the crop, wherein the concentration of boron in the tissue of the crop as compared to an untreated crop is increased. In some embodiments, the concentration of potassium in the tissue of the crop as compared to an untreated crop is increased.

COMPOSITIONS AND METHODS TO REDUCE DICAMBA VOLATILITY AND PROVIDE PLANT ESSENTIAL NUTRIENTS

CROSS REFERENCE TO RELATED APPLICATIONS

The present application is a continuation of International Patent Application No. PCT/US2020/062780, filed Dec. 2, 2020, which claims the benefit of priority to U.S. Provisional Application No. 62/942,564, filed Dec. 2, 2019, the contents of which are incorporated by reference in their entirety.

INTRODUCTION

The release of transgenic soybean that is tolerant to the herbicide dicamba has provided another tool for pigweed control but has also resulted in thousands of reports of dicamba damage to non-transgenic, dicamba-sensitive soybean. The widespread damage caused by dicamba is partly due to the sensitivity of many species to this herbicide and to the propensity of dicamba to volatilize.

In Arkansas, soybean damaged by dicamba in 2017 and 2018 was estimated at 900,000 and 400,000 acres, respectively. Unfortunately, the same chemistry that makes dicamba effective in controlling weeds also results in its high volatility. Therefore, potential changes to the chemistry of this herbicide may reduce its efficacy. Thus, there remains a need in the art for formulations of dicamba with reduced volatility.

SUMMARY

Compositions and methods to reduce herbicide volatility and provide plant essential nutrients are provided. One aspect of the invention provides for compositions comprising an acidic herbicide, an effective amount of a borate, and an aqueous solvent where the effective amount of the borate reduces the volatility of the acidic herbicide and wherein the pH of the composition is greater than 5. In some embodiments, the borate is a potassium borate salt. The effective amount of borate may be less than 30 grams per liter or a field-applied amount of 0.05 to 1.0 pounds boron per acre. Suitably, the acidic herbicide may be dicamba (3,6-dichloro-2-methoxybenzoic acid) or an agriculturally acceptable salt or ester thereof.

Another aspect of the invention provided for a method for preparing the compositions described herein. The method comprises providing the effective amount of a borate and mixing the effective amount of the acidic herbicide and the effective amount of the borate salt in the aqueous solvent.

Another aspect of the invention provides for a method for the control of a weed in a crop. The method comprises applying any of the compositions described herein to an area having the crop therein. Herbicidal volatilization injury to a plant outside of the application area may be reduced as compared to application of the acidic herbicide without the borate. In some embodiments, the plant outside of the application area is a herbicide intolerant crop and the herbicide intolerant crop at a distance at least 10 feet from the application area has less than 5% injury.

Another aspect of the invention provides for the inhibition of growth or proliferation of a weed or the killing of the weed. The method comprises applying any of the compositions described herein to an area having the weed therein. In some embodiments, the method controls at least on broadleaf weed. In some embodiments, herbicidal volatil-

BRIEF DESCRIPTION OF THE DRAWINGS

FIG. 4 shows photographs depicting the setup of the field trial detailed above. Dicamba-sensitive soybean were grown in low tunnels to increase volatilization of dicamba from treated flats of soil and to evaluate extent of injury caused by vapor movement within the tunnels.

DETAILED DESCRIPTION

Figure 1:
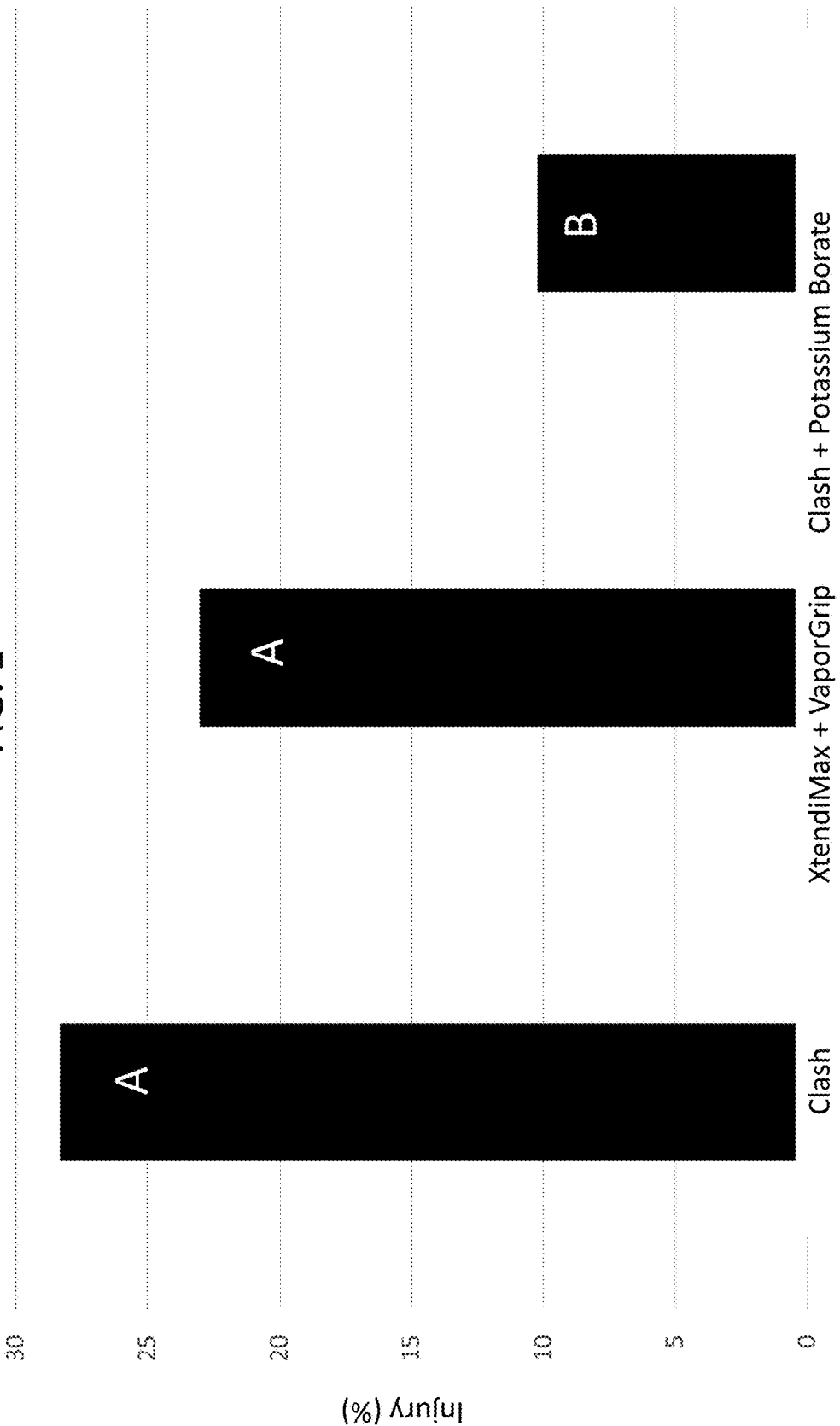
FIG. 1 shows a bar graph depicting the percent injury measured in a field trial in which the indicated treatments were applied to trays of soil placed between rows of dicamba-sensitive soybean grown in a low tunnel. The treatments include a diglycolamine (DGA) salt of dicamba (Clash™) alone and combined with potassium borate. The results are compared to those obtained with XtendiMax® with VaporGrip®, a proprietary formulation of dicamba with reduced volatility. All treatments also included glyphosate (Roundup PowerMax II). These data were taken 21 days after treatment and are representative of two experimental runs. For each of the figures, the different letters on the bars of the graphs indicate a significant difference with $P<0.05$ based on Fisher's protected least significance test?

Described herein are compositions and methods for the control of weeds with reduced volatilization injury to plants that are not targeted for weed control. Currently available formulations of acidic herbicides, such as dicamba, have a wide range of volatilization potentials. The more acidic the herbicide/water solution is, the more likely the herbicide is to volatilize and affect neighboring non-tolerant plants. As demonstrated in the Examples, borate added at low concentrations to an acidic herbicide significantly reduces off-target plant injury.

Moreover the compositions and methods also provide a method for increasing nutrients in plant tissues. Two of the primary nutrients required for optimal soybean growth are potassium (K) and boron (B). These nutrients are often limiting in typical soils cropped to soybean. Thus, in many areas they are a significant factor limiting soybean yield potential. As a result, soybean typically receive annual applications of K, B, or both. These nutrients are typically applied in-season at the onset of deficiency symptoms. The compositions described herein simultaneously provide weed control and essential nutrients, such as K and B, in a single application.

The present invention provides compositions comprising an effective amount of one or more acidic herbicides, such as dicamba (3,6-dichloro-2-methoxybenzoic acid), glyphosate (2-(phosphonomethylamino)acetic acid), glufosinate (2-amino-4-[hydroxy(methyl)phosphoryl]butanoic acid), 2,4-D (2,4-dichlorophenoxyacetic acid) or an agriculturally acceptable salt or ester thereof. An effective amount of an herbicide is an amount of herbicide capable of controlling one or more weeds, such as broadleaf weeds, in a crop alone or in combination with one or more additional herbicides. Suitably, the effective amount of herbicide applied to a field or weed may be the labeled amount of herbicide for the desired application. Labeled amount refers to the art recognized amount of herbicide that should be applied to a particular weed for effective control. In some embodiments, the effective amount of acidic herbicide as an as-applied amount of less than 1500 g ae/ha, including without limitation between 100 to 1500 g ae/ha, 100 to 1400 g ae/ha, 100 to 1300 g ae/ha, 100 to 1200 g ae/ha, 100 to 1100 g ae/ha, 100 to 1000 g ae/ha, 100 to 900 g ae/ha, 100 to 800 g ae/ha, 100 to 700 g ae/ha, or 100 to 600 g ae/ha.

In some embodiments, the acidic herbicide is dicamba. Dicamba (3,6-dichloro-2-methoxybenzoic acid, also called 3,6-dichloro-o-anisic acid) is a benzoic acid synthetic auxin herbicide used to selectively control a wide spectrum of broadleaf weeds. Synthetic auxins are quickly absorbed by the plant leaves, stems and roots. These herbicides mimic the plant growth hormone auxin, thereby affecting plant growth regulation.

Dicamba is typically formulated as a salt, such as a sodium, potassium, diethanolamine, isopropylamine, diglycolamine (DGA), or dimethylamine (DMA) salt. In some embodiments, the dicamba is formulated as a dimethlyamine (DMA) salt or a diglycolamine (DGA) salt of dicamba. Commercially available dicamba formulations include, without limitation, XtendiMax® and Clarity® (BASF, NC, USA); Banvel®, Banvel M®, Banvel II®, Banvel SGF®, and Vanquish® (Syngenta, Wilmington, Del. USA); Rifle® (Loveland Products, Inc., Loveland, Colo., USA); and Clash (Nufarm Americas, Inc). In certain embodiments, the dicamba formulation is Clarity® or Clash.

One issue with dicamba is that the herbicide is volatile and often causes damage to adjacent non-tolerant crops. This volatility can be reduced by increasing the pH of the formulation, but the increased pH or other additives in these formulations often impact the herbicidal function and while decreasing volatility and damage to adjacent crops these formulations often also reduce the effectiveness of weed control by the herbicide. Thus, there is a need to find alternative dicamba formulations that reduce the volatility of the dicamba yet maintain the effectiveness of the weed control.

In some embodiments, the acidic herbicide is glyphosate, which may be used in combination with an herbicide such as dicamba or on its own. Glyphosate is relatively insoluble in water, and consequently it is typically formulated as a water-soluble salt such as a sodium, potassium, ammonium, isopropylamine, or monoethanolamine salt of glyphosate. Glyphosate is commonly applied to the foliage of the target plant. Any commercially available formulation of glyphosate may be used with the present invention. Suitable formulations include, without limitation, (1) formulations from the Monsanto Company (St. Louis, MO): Roundup ProMax, Roundup PowerMax, Roundup PowerMax II, Roundup WeatherMax® (Glyphosate potassium salt), Landmaster II (glyphosate isopropylamine salt plus 2-4-D isopropylamine salt), and Roundup Xtend (glyphosate and dicamba); (2) formulations from Dow AgroSciences LLC (Indianapolis, IN): Dow Accord XRT II (glyphosate dimethlammonium salt) and Accord XRT (Glyphosate isopropylamine salt); and (3) formulations from Syngenta: Touchdown Total (Glyphosate potassium salt). In some embodiments, the glyphosate formulation used is Roundup PowerMax II.

In some embodiments, the acidic herbicide is glufosinate, which may be used in combination with an herbicide such as dicamba or on its own. Glufosinate, 2-amino-4-[hydroxy(methyl)phosphoryl]butanoic acid, is a non-proteinogenic alpha-amino acid that is a 2-aminobutanoic acid which is substituted at position 4 by a hydroxy(methyl)phosphoryl group. In some embodiments, glufosinate may be provided as a salt, such as an ammonium salt. Glufosinate is a water-soluble, nonselective, broad-spectrum, post-emergence herbicide that controls annual and perennial broadleaf and grass weed species in a variety of crops. Glufosinate irreversibly inhibits glutamine synthetase, an enzyme necessary for the production of glutamine and for ammonia detoxification. Thus, application of glufosinate leads to reduced glutamine levels and elevated ammonia levels in plant tissues, halting photosynthesis and resulting in plant death.

In some embodiments, the acidic herbicide is 2,4-D, which may be used in combination with a herbicide such as dicamba or on its own. 2,4-D (2,4-dichlorophenoxyacetic acid) is a systemic herbicide which selectively kills most broadleaf weeds by causing uncontrolled growth in them. 2,4-D is used in many places including turf, lawns, rights-of-way, aquatic sites, forestry sites, and a variety of field, fruit and vegetable crops. It may also be used to regulate the growth of citrus plants. Products are sold in liquid (concentrated or ready-to-use), dust, or granule formulations and in different chemical forms, including salts, esters, and an acid form.

In some embodiments, the acidic herbicide may be used in combination with one or more graminicide. A graminicide a herbicide capable of controlling weedy grasses. In some embodiments, a graminicide may be used in combination with dicamba where a grass is resistant to another herbicide, such as glyphosate. Exemplary graminicides include, without limitation, fluazifop (butyl (2R)-2-[4-[5-(trifluoromethyl)pyridin-2-yl]oxyphenoxy]propanoate), clethodim (2-[(E)-N-[(E)-3-chloroprop-2-enoxy]-C-ethylcarbonimidoyl]-5-(2-ethylsulfanylpropyl)-3-hydroxycyclohex-2-en-1-one), sethoxydim (2-[(E)-N-ethoxy-C-propylcarbonimidoyl]-5-(2-ethylsulfanylpropyl)-3-hydroxycyclohex-2-en-1-one), or quizalofop (2-[4-(6-chloroquinoxalin-2-yl)oxyphenoxy] propanoic acid).

The compositions described herein also comprise an effective amount of a borate. Borate serves several roles. Borate can scavenge free hydrogens, provide buffering capacity, provide a nutritional benefit, or any combination thereof. An effective amount of borate is an amount of borate capable of reducing the volatility of an acidic herbicide or to reduce herbicidal volatilization injury. Suitably, the effective amount of borate may also result in a composition with the acidic herbicide that has a pH greater than 5, including without limitation greater than a pH of 6, 7, 8, or 9. Combining the essential plant nutrient boron with an acidic herbicide serves to reduce the volatility of the herbicide, thereby reducing the potential for off-site movement and damage to non-target crops, allows the user to control weeds and improve crop growth in a single field pass.

Borates are compounds comprising boron and oxygen capable of forming boron oxyanions. Borates are composed of trigonal planar $BO_3$ or tetrahedral $BO_4$ structural units, joined together via shared oxygen atoms and may be cyclic or linear in structure. Suitably the borate may be provided as boric acid $B(OH)_3$, orthoborate ($[BO_3]^{3-}$), or a polyborate anion, such a triborate ($[B_3O_5]^-$), tetraborate ($[B_4O_7]^{2-}$) or pentaborate ($[B_5O_9]^-$) anions. The borate may be provided as a salt such as an alkali or alkaline earth metal borate salt. In particulate embodiments, the borate is provided as a potassium or sodium borate salt, such as $BK_3O_3$, $K_2B_4O_7$, $BNa_3O_3$, $Na_2B_4O_7$, of $Na_2[B_4O_5(OH)_4]$ hydrated or anhydrous salts.

The borate may be added as a salt or as a concentrated salt solution. It may be included in a co-formulation with the acidic herbicide (e.g., as a premix) or may be added to the tank mix as a separate formulation. In some embodiments, the effective amount of borate is less than 30 grams per liter. As demonstrated in the examples, low concentrations of borate are capable of significantly reducing herbicide volatility. In particular embodiments, the effective amount of borate is from 1 to 25 grams per liter, 1 to 20 grams per liter, 1 to 15 grams per liter, 1 to 10 grams per liter, or 1 to 5 grams per liter. In some embodiments, the effective amount of borate includes the weight of a borate counteraction such as sodium or potassium.

The amount of borate is adjusted in the final tank mix to achieve the correct field rate of application. In some embodiments, the effective amount of potassium borate is a field-applied amount of less than 1 pound boron per acre. In particular embodiments, the effective amount of potassium borate is a field-applied amount of 0.05 to 1.0 pounds, 0.05 to 0.9, 0.05 to 0.08, 0.05 to 0.7, 0.05 to 0.6, 0.05 to 0.5, 0.05 to 0.4, 0.05 to 0.3, or 0.05 to 0.2 pounds boron per acre.

The compositions of the present invention may further comprise additional reagents, such as adjuvants, buffering agents, surface-active agents, and/or carriers that improve the application characteristics or herbicidal activity of the composition.

For example, adjuvants can be used to increase the amount of material that penetrates the waxy outer layer of leaves, thereby increasing contact between the material to be absorbed and the surface membrane of the leaf. An adjuvant enhances herbicidal activity by activating the herbicide or modifying the physical properties of the herbicide. Suitable adjuvants include, for example, surfactants, wetting agents, spreaders or stickers.

A buffering agent is a weak acid or base used to maintain the acidity (pH) of a solution near a chosen value after the addition of another acid or base. That is, the function of a buffering agent is to prevent a rapid change in pH when acids or bases are added to the solution. The buffering agent may be selected to act in combination with the borate to keep the composition comprising the acidic herbicide at or near a desired value. In some embodiments, the buffering agent is provided to stabilize the pH of the composition between a range of 6 to 9, including within 6 to 7, 7 to 8, or 8 to 9.

The herbicide/nutrient treatments of the present invention may be applied in combination with other pesticidally active substances, such as other herbicides, fungicides or insecticides. Applying several herbicides with distinct mechanisms of action may be useful, for example, for treating fields with herbicide-resistant weeds such as barnyardgrass. The herbicide treatments may also be applied in combination with safeners, fertilizers and/or growth regulators, for example in the form of a ready mix or a tank mix.

The compositions of the present invention may be prepared by tank mixing, as is standard practice in the art. In some embodiments, the acidic herbicide, borate, and any optional additional reagents (e.g., glyphosate or adjuvants) may be added to the tank mix as separate formulations. In other embodiments, at least two of these components are added as a combined formulation (e.g., Roundup Xtend). Each component may be provided in any available form, e.g., as a salt or as a concentrated solution.

Figure 2:
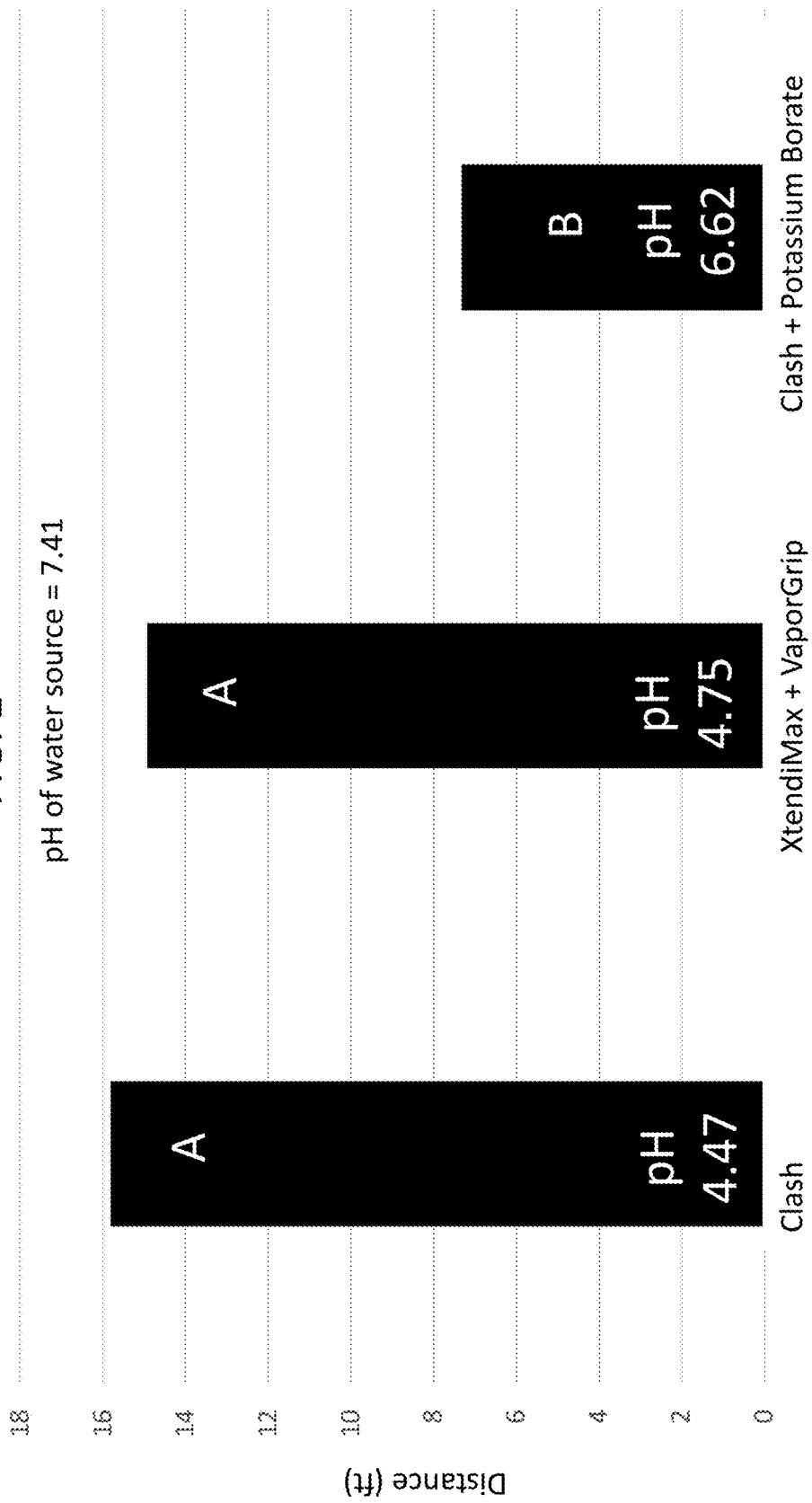
FIG. 2 shows a bar graph depicting the distance to 5% soybean injury measured in the field trial detailed above. These data were taken 21 days after treatment and are representative of two experimental runs. The pH of the tank mix is indicated on each bar.
Figure 3:
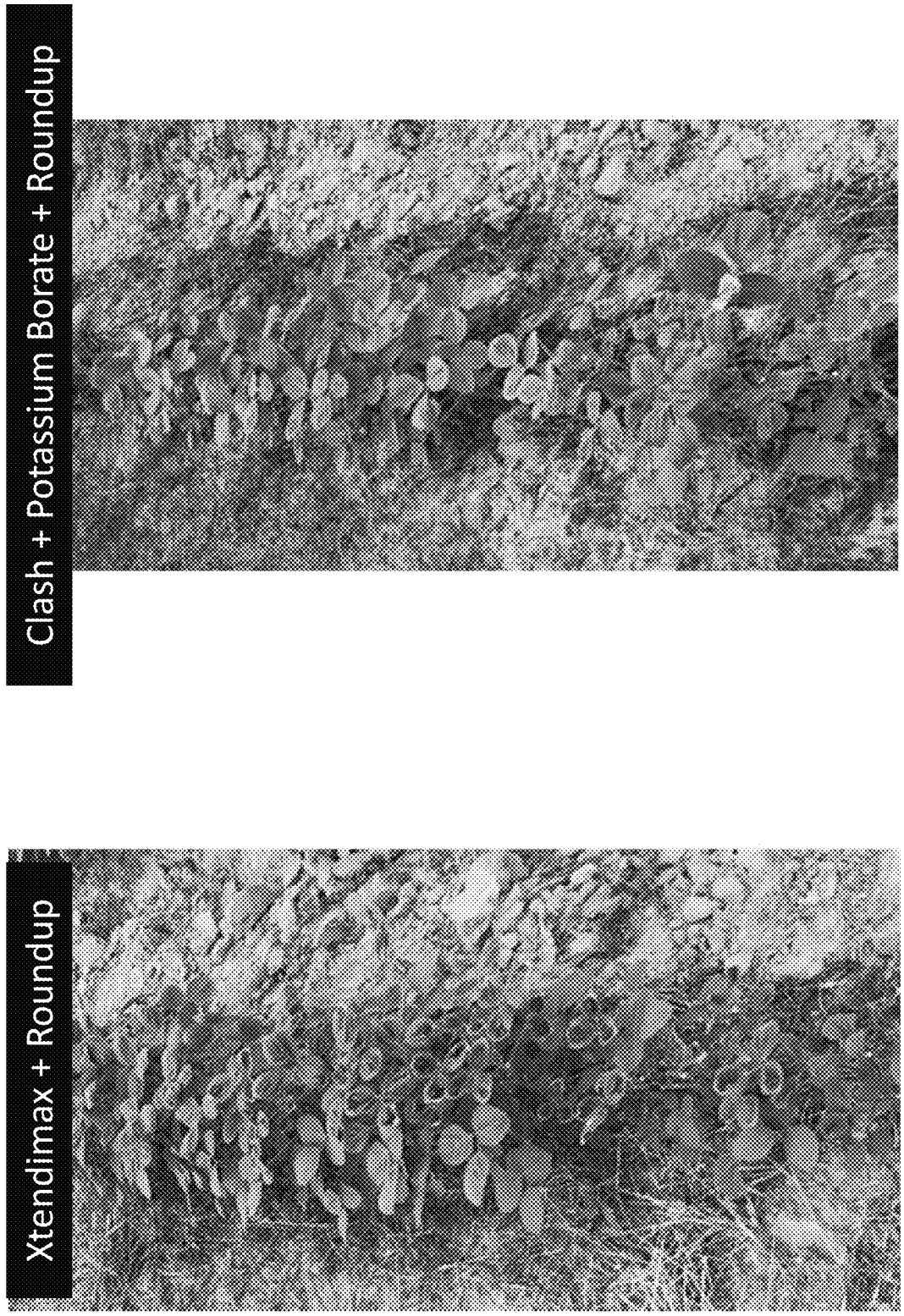
FIG. 3 shows photographs of soybean following movement of dicamba from trays of soil treated with XtendiMax® with VaporGrip® and glyphosate (Roundup PowerMax II; LEFT) and with Clash™, potassium borate and glyphosate (RIGHT).

One objective of the present invention is to reduce the volatility of acidic herbicides, such as dicamba, when it is applied to a field. In the Examples, the inventors demonstrate that the addition of potassium borate to dicamba (1) reduced injury to sensitive soybean by as much as 18 percentage points as compared to standard tank mixes of dicamba (FIG. 1), and (2) reduced the distance to 5% soybean injury by roughly 50% (FIG. 2). Together, these results indicate that the addition of potassium borate lowers dicamba volatility and reduces the lateral movement of dicamba. Thus, in some embodiments, the volatility of the dicamba is reduced as compared to its volatility in the absence of borate.

Without being limited to any mechanism of action, borate reduces the volatility of an acid herbicide, such as dicamba, by raising the pH of the tank mix. Both dicamba and glyphosate significantly lower the pH of a solution, which increases the volatility of the dicamba molecule. Thus, efforts to reduce the volatility of dicamba often involve scavenging hydrogen ions from the tank mix solution to increase the pH. Potassium borate ($K_2B_4O_7$) or sodium borate ($Na_2[B_4O_5(OH)_4]$) scavenge hydrogen ions for every one molecule of borate added. As a result, the compositions of the present invention are roughly three to four times more effective than the products that are currently on the market. In the Examples, the inventors demonstrate that the addition of potassium borate increased the pH of tank mixes comprising glyphosate and various formulations of dicamba by as much as 2.15 pH units, confirming the strong scavenging potential of borate. Thus, in some embodiments, the pH of the composition is greater than 5 when it is prepared as a solution. One of skill in the art will recognize the pH of the tank mix will vary depending of the particular herbicide formulation(s) used and the pH of the water used to dilute the solution. Thus, the amount of borate required to adjust the pH to the desired level will vary depending on such conditions, including the use of a buffering agent.

The present invention also provides methods of applying an herbicide to a crop. The methods involve applying the compositions disclosed herein to an area, such as a field, having the crop therein. These methods allow the user to control weeds and improve crop growth in a single field pass.

The methods also provide for reduced herbicidal volatilization injury. Reduced herbicidal volatilization injury includes injury to plants away from the targeted area of application. As a result, a benefit of the presently disclosed technology is reduced plant injury to crops in fields other than the one targeted for herbicide application. A reduction in herbicidal volatilization injury may be determined by an observable reduction in plant injury at a determined distance away from the area of herbicide application or an observable reduction in the distance away from the area of herbicide application to achieve a determined level of plant injury with the application of the compositions described herein when compared to application of the acidic herbicide without borate. In some embodiments, the plant injury when the borate containing composition is applied may be 50%, 40%, 30%, 20%, 10%, 5%, or 1% of the amount of plant injury at a determined distance when compared to the same amount of herbicide application without borate. In some embodiments, the distance to 5% plant injury when the borate containing composition is applied may be 50%, 40%, 30%, 20%, 10%, 5%, or 1% of the amount of plant injury at a determined distance when compared to the same amount of herbicide application without borate. In particular embodiments, the distance to 5% plant injury may be a distance of less than 10 feet, including less than 9 feet, 8 feet, 7, fee, 6 feet, 5 feet, 4 feet, 3 feet, or less than 2 feet, when the compositions comprising borate are described herein are applied.

The crop used with the present invention may be any crop including, without limitation, vegetable crops, fruit crops, grain crops, flowers, and root crops. Crops further encompass hybrids, inbreds, and transgenic or genetically modified plants. In some embodiments, the crop is soybean or cotton.

In some embodiments, the crops are tolerant or resistant to the acidic herbicide, such as dicamba. As used herein, "tolerant" or "resistant" are used interchangeably to refer to plants in which higher doses of an herbicide are required to produce undesirable effects similar to those seen in non-tolerant plants (e.g., pronounced leaf cupping, stunting, and death). Examples of such plants include dicamba resistant corn, cotton or soybean. A tolerant plant need not possess absolute or complete tolerance such that no detrimental effect to the plant or plant variety is observed when herbicide is applied. Instead, a tolerant plant will simply be less affected by herbicide than a comparable sensitive (i.e., non-tolerant) plant or variety. The crop may be naturally tolerant to the herbicide or may be genetically enhanced to tolerate the herbicide. Tolerance to a specific herbicide can be conferred, for example, by engineering genes into crops that encode appropriate herbicide metabolizing enzymes and/or insensitive herbicide targets.

A second objective of the present invention is to increase the concentration of boron and/or potassium in a tissue of the crop as compared to an untreated crop. Soil deficiencies for essential plant nutrients can lead to lower crop yields. Potassium and boron are often limiting factors for soybean growth, for example. It is highly inefficient to provide nutrients by simply spraying fields because when nutrients are applied to soils, they become insoluble in water, making them unavailable for plant uptake. Thus, to be cost effective, nutrients are typically applied directly to plant foliage for rapid uptake. However, providing nutrients as a separate field application significantly increases production cost. By combining essential nutrients with an herbicide treatment, the present invention saves the cost of at least one field application. In some embodiments, the potassium borate is applied to the crop at a rate of 0.05-1 pound per acre. Those of skill in the art will recognize that the ideal application rate will depend on the degree of nutrient deficiency of the field.

The present invention also provides methods of controlling weeds. The methods involve applying an effective amount of the compositions disclosed herein to a field. In some embodiments, the methods are used to control at least one broadleaf weed. Suitable weeds include, for example, Palmer amaranth and waterhemp, which are common targets of dicamba treatment in U.S. soybean production.

As used herein, "weed control" refers to any observable measure of control of plant growth, which can include one or more of the actions of (1) killing, (2) inhibiting growth, reproduction or proliferation, and (3) removing, destroying, or otherwise diminishing the occurrence and activity of plants. Weed control can be measured by any of the various methods known in the art. For example, weed control can be determined as a percentage as compared to untreated plants following a standard procedure wherein plant mortality and growth reduction is visually assessed by one skilled in the art. Control may be defined, for instance, in terms of mean plant weight reduction or percentage of plants that fail to emerge following pre-emergence herbicide application. A "commercially acceptable rate of weed control" varies with the weed species, degree of infestation, environmental conditions, and the associated crop plant. Typically, commercially effective weed control is defined as the destruction (or inhibition) of at least about 60%, 65%, 70%, 75%, 80%, or even at least 85%, or even at least 90% of the weed plants.

Although it is generally preferable from a commercial viewpoint that 70-80% or more of the weeds be destroyed, commercially acceptable weed control can occur at much lower destruction or inhibition levels, particularly with some noxious, herbicide-resistant plants.

EXAMPLES

Example 1

A field trial was conducted to determine the effect of adding potassium borate to the herbicide dicamba with respect to the volatilization of dicamba and the movement of dicamba within the environment. In this trial, potassium borate was added to two highly volatile formulations of dicamba, Clarity® (BASF) and Clash™ (Nufarm Americas, Inc), in combination with glyphosate (Roundup PowerMax II®). Notably, Clarity® and Clash® contain a diglycolamine (DGA) salt of dicamba. The formulations were applied to a moistened silt loam soil in contained in two plastic trays and placed under 20-foot long tunnels between two rows of dicamba-sensitive (i.e., non-tolerant) soybean crop. For comparison, soybean were also treated with XtendiMax® Herbicide with VaporGrip®, a proprietary formulation of dicamba with reduced volatility. Dicamba was tank-mixed with the potassium salt of glyphosate and all herbicides were applied at a 4× rate to ensure sufficient volatilization from the treated flats of soil. Tunnels were removed 48 hours after initiating the experiment and trays of treated soil were also removed from the field. Soybean injury was visually assessed at 14 and 21 days after initiation of the experiment. Likewise, the distance from the center of the tunnel to the furthest observed 5% level of injury was measured. Air samplers in the center of each tunnel were also used to quantify dicamba volatilization. When potassium borate was added to dicamba, it was applied at 30 g/L of spray solution.

Field Trial Results:

The addition of potassium borate resulted in an increase in tank mix pH of 1.9-2.15 across the various formulations of dicamba mixed with glyphosate (dicamba+glyphosate). The addition of potassium borate reduced sensitive soybean injury by as much as 18% as compared to standard tank mixes of dicamba or dicamba+glyphosate (FIG. 1).

The distance to 5% crop injury on a sensitive soybean cultivar was measured during this field trial. The results reveal a ~50% reduction in the distance to 5% soybean injury (FIG. 2), indicating that the volatility and lateral movement of dicamba were significantly reduced by the addition of potassium borate across all tested tank mix formulations of dicamba and dicamba+glyphosate. These findings were corroborated by a second, separate field trial.

Materials and Methods

In order to evaluate a proprietary volatility reducing agent on several dicamba formulations, two low-tunnel trials were conducted in Fayetteville, Arkansas in 2019. Treatments were arranged as a single-factor randomized complete block with three replications. Dicamba products evaluated included the diglycolamine (DGA) salt of dicamba (Xtendimax) plus a commercial volatility reduction agent (Vapor-Grip), DGA salt of dicamba (Clarity) with the volatility reduction agent $BK_3O_3$, the dimethylamine (DMA) salt of dicamba (Vanquish), and the DMA salt with $BK_3O_3$ along with a nontreated. The glufosinate-resistant cultivar was planted (CDZ 4938) on 0.91-m wide rows to serve as a bioindicator to quantify visible injury caused by dicamba volatilization. Two flats (35.6×45.7 cm) of moistened silt loam soil were treated approximately 1 km from the experiment test site with 4× rates of each dicamba product plus glyphosate (Roundup PowerMax II), with a 1× being 560 and 670 g ae/ha, respectively. The $BK_3O_3$ rate was 30 g/L of spray solution and all treatments were applied at a 140 L/ha spray volume. Treated flats were placed into the corresponding tunnel (1.5 m wide by 6 m long) along with a single high-volume air sampler between two rows of soybean to measure volatility. Immediately following trial initiation, pH of each spray solution was collected and analyzed. Flats of soil, air samplers, and tunnels were removed 48 hours after initiating the experiment. For data collection, soybean under each tunnel was divided into eight quadrants and visible injury to soybean assessed. Distance to 5% injury to soybean was measured from the center of each tunnel in the direction where greatest injury was observed, typically in the downwind direction from the treated flat.

Example 2

To further evaluate the efficacy of potassium tetraborate tetrahydrate in reducing volatilization of dicamba, a series of low-tunnel trials were conducted in Fayetteville, Arkansas in 2020, with each trial replicated twice. Experimental treatments were arranged as a single-factor randomized complete block design with three replications. Specific treatments can be found in each of the below figures. A glufosinate-resistant cultivar (CDZ 4938) was planted on 36-inch spaced rows, serving as a bioindicator to quantify visible injury and distance traveled caused by dicamba volatility. Each low-tunnel placed in the field measured 5 by 20 ft (covering two rows of soybean). All tunnels were covered with transparent plastic to create an environment suitable for volatility and to contain the injury. After all tunnels were placed in the field, moistened flats of soil were placed 0.5 miles from the field and treated. Once treated, two flats were placed into appropriate tunnels between two rows of soybean with one flat on either side of a high-volume air sampler located in the center of each tunnel for 48 hours. Afterwards, the flats of soil, air samplers and tunnels were removed from the field. Immediately following trial initiation, pH of each spray solution was collected and analyzed. For data collection, soybean under each tunnel were divided into eight quadrants of 5 foot in length where visible injury was assessed on a 0 to 100 scale, where 0 equals no injury and 100 equals plant death. Distance to 5% injury was measured from the center of each tunnel in the direction where greater symptomology was observed, which was typically in the downwind direction from the treated flats. All data were subjected to analysis of variance and means separated using Fisher's protected least significance test ($\alpha=0.05$)

Potassium tetraborate tetrahydrate (Kborate) serves two critical roles when mixed with dicamba and applied over-the-top of soybean. It reduces volatility of dicamba by 1) scavenging free hydrogen ions and 2) serves as a pH buffer, often keeping the pH of the spray solution above 6.0 at a Kborate concentration of 0.025 molar, even when mixed with the potassium salt of glyphosate (Table 1). Additionally, the boron in Kborate meets the nutritional needs of soybean at the rates that effectively reduce dicamba volatility.

Figure 5:
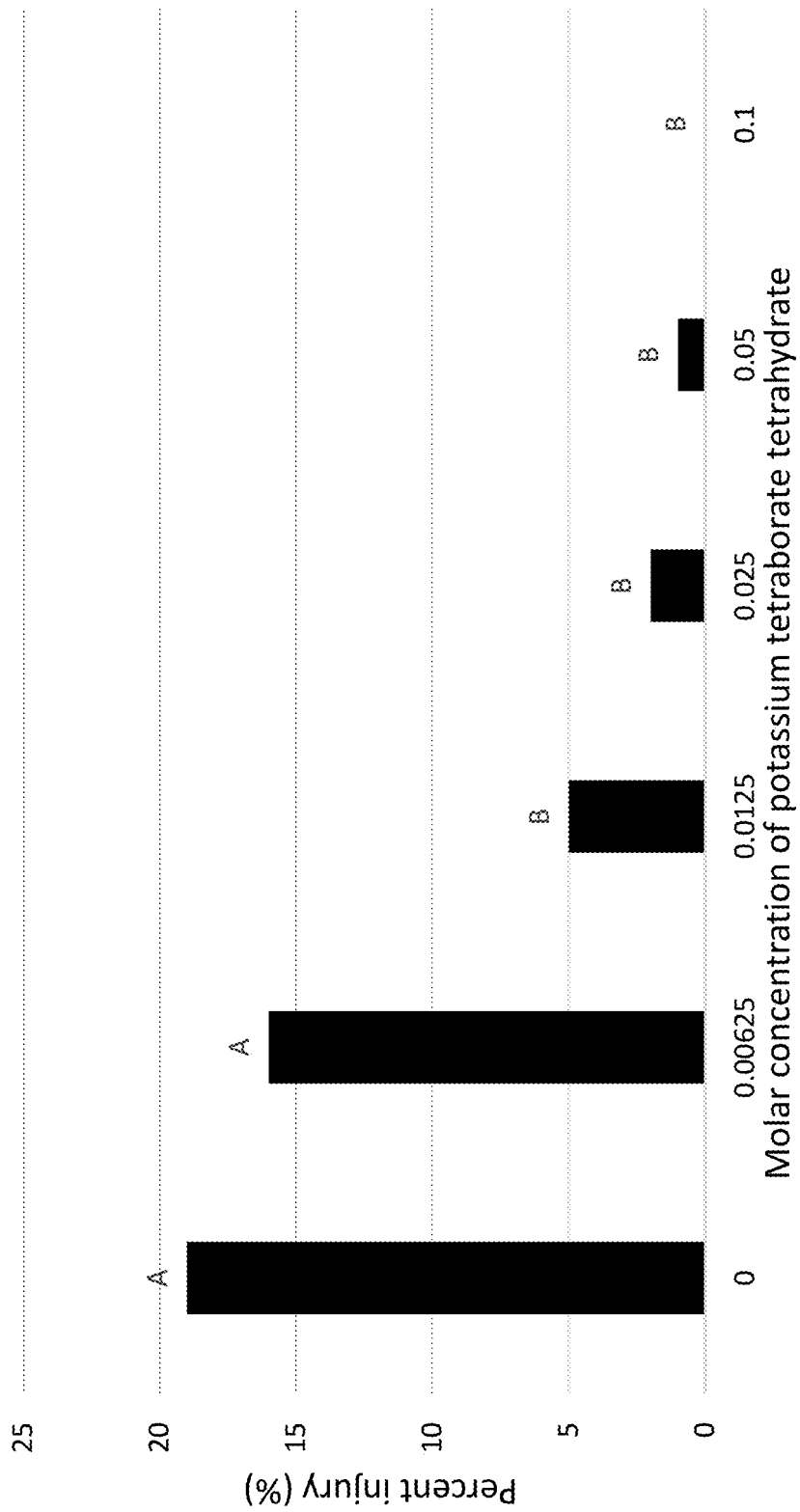
FIG. 5 shows soybean injury caused by volatilization of the diglycolamine salt of dicamba mixed with the potassium salt of glyphosate in response to potassium borate molar concentrations averaged over eight quadrants per plot at 21 days after implementing each treatment.
Figure 6:
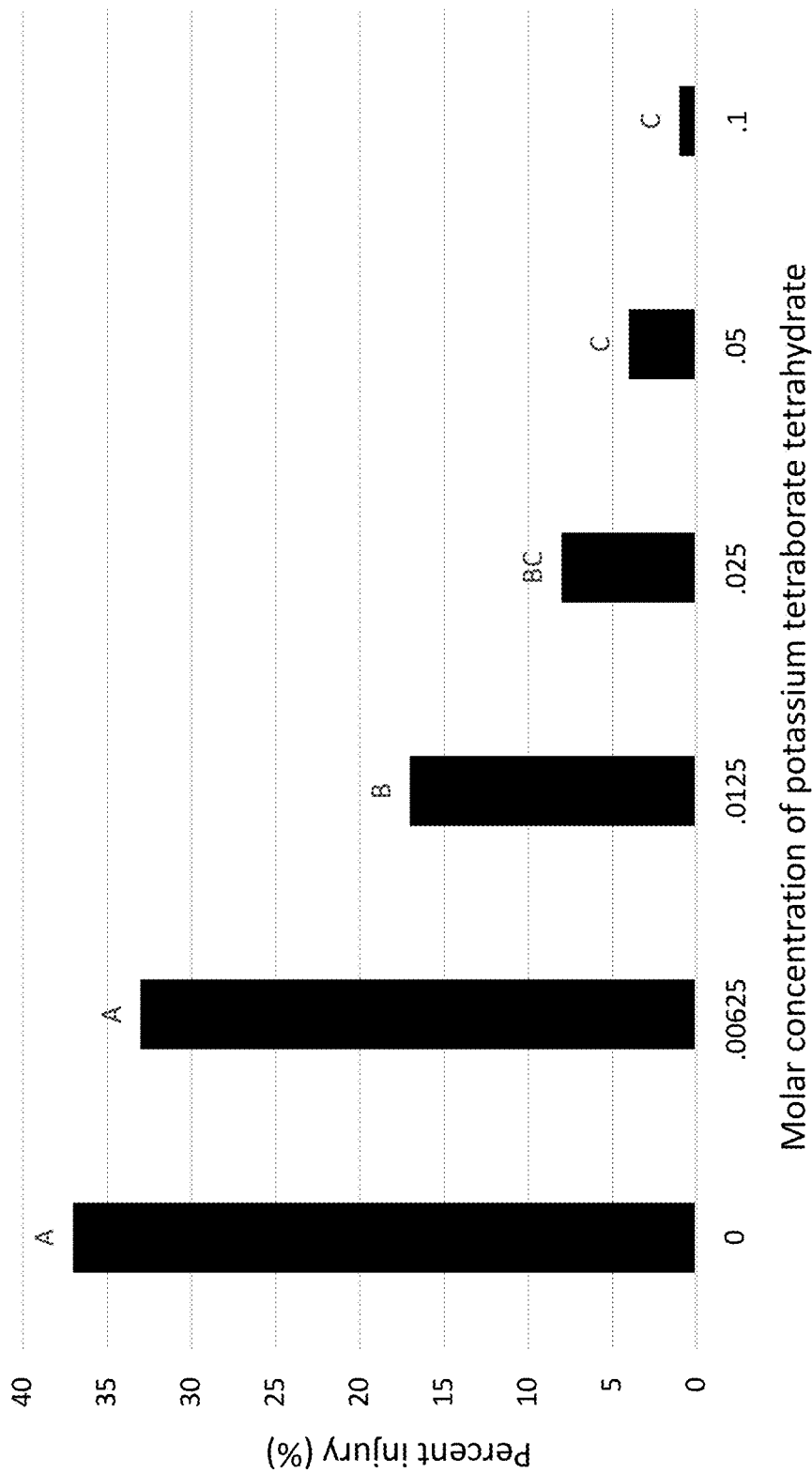
FIG. 6 shows maximum soybean injury caused by volatilization of the diglycolamine salt of dicamba mixed with the potassium salt of glyphosate in response to varying potassium borate molar concentrations at 21 days after implementing each treatment.
Figure 7:
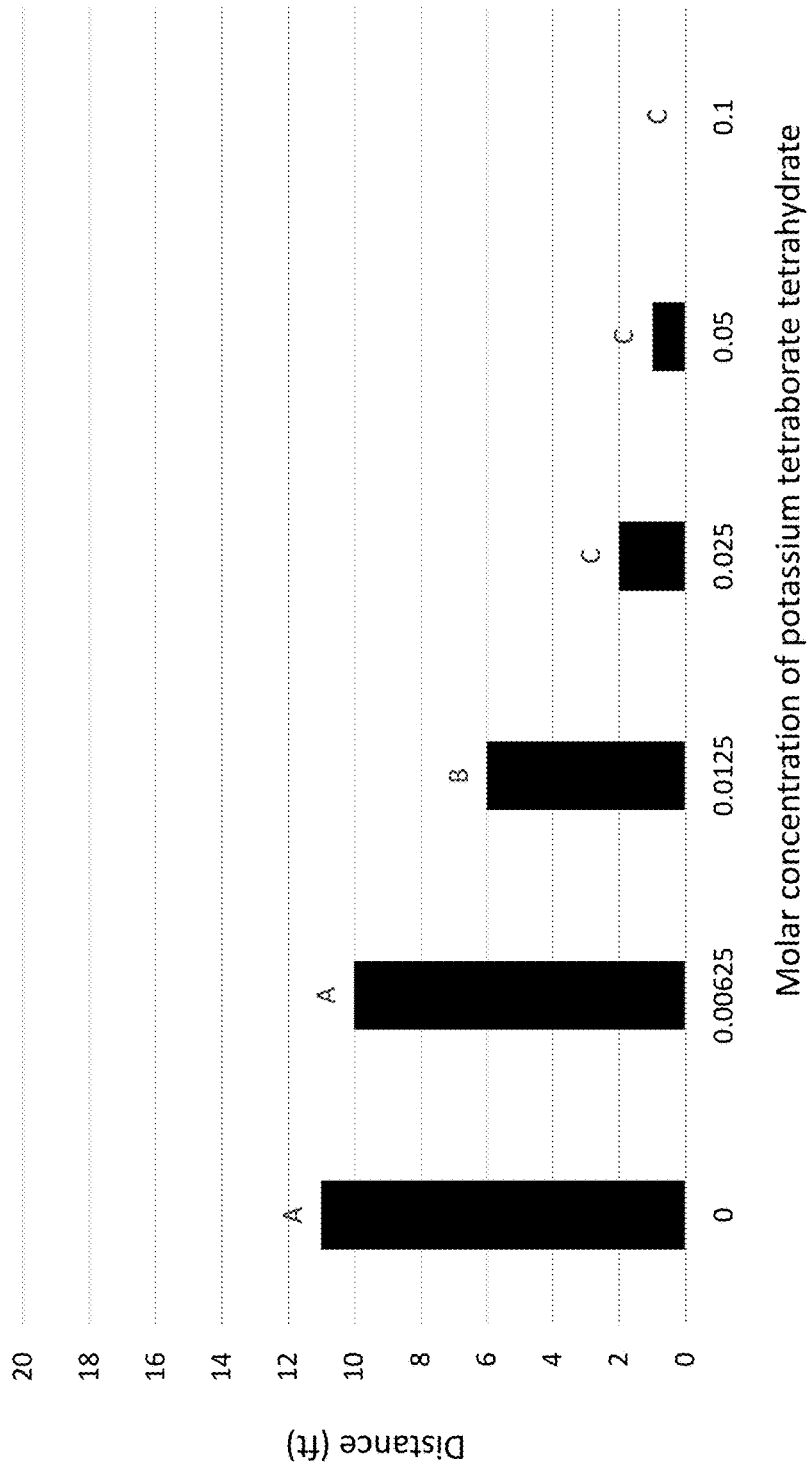
FIG. 7 shows distance from the center of each tunnel to 5% visible injury observed on soybean caused by volatilization of the diglycolamine salt of dicamba mixed with the potassium salt of glyphosate in response to varying potassium borate molar concentrations at 21 days after implementing each treatment.

All Kborate concentrations of 0.0125 molar or higher significantly reduced volatilization of a dicamba plus glyphosate mixture based on average and maximum injury ratings and distance to 5% injury to soybean (FIGS. 5-7). When applying the treatments at 15 gallons of spray solution per acre, the corresponding rate of nutrient delivery to soybean would be 0.066 to 0.53 lbs boron/A for the Kborate concentrations that reduced volatility.

Figure 8:
FIG. 8 shows soybean injury caused by volatilization of the diglycolamine salt of dicamba mixed with the potassium salt of glyphosate in response to molar concentrations of potassium borate and potassium acetate averaged over eight quadrants per plot at 21 days after implementing each treatment.
Figure 9:
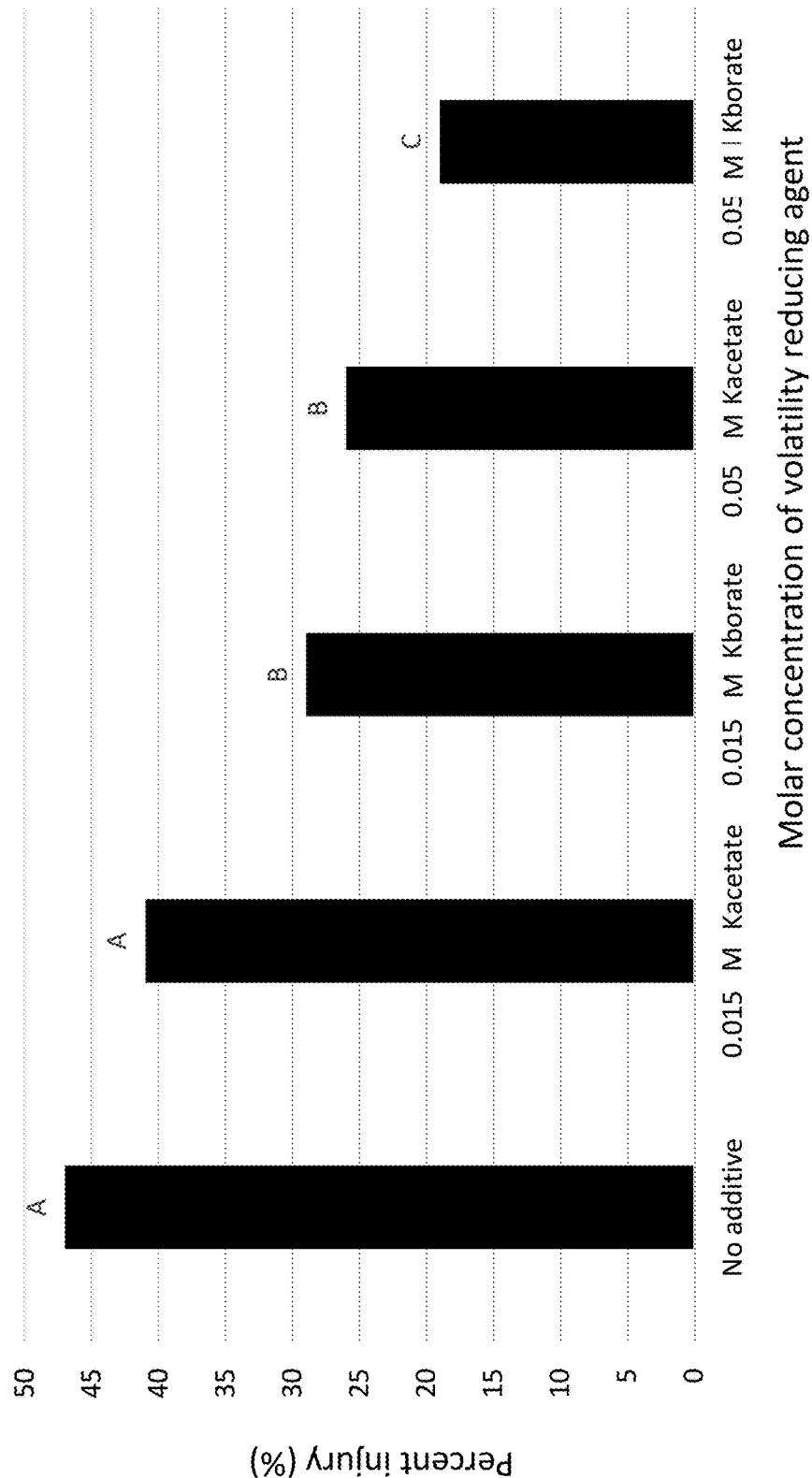
FIG. 9 shows maximum soybean injury caused by volatilization of the diglycolamine salt of dicamba mixed with the potassium salt of glyphosate in response to molar concentrations of potassium borate and potassium acetate at 21 days after implementing each treatment.
Figure 10:
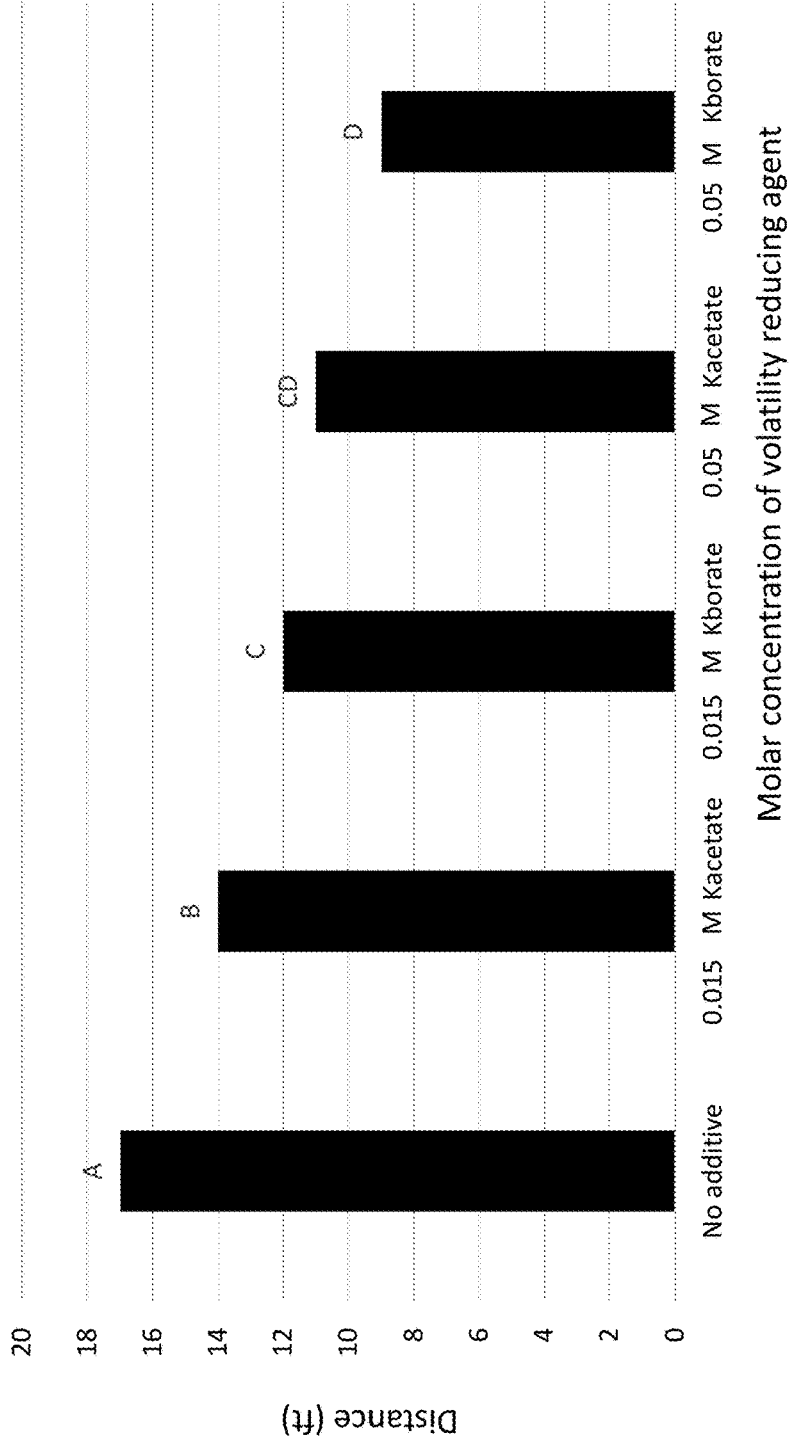
FIG. 10 shows distance from the center of each tunnel to 5% visible injury observed on soybean caused by volatilization of the diglycolamine salt of dicamba mixed with the potassium salt of glyphosate in response to molar concentrations of potassium borate and potassium acetate at 21 days after implementing each treatment.

Kborate outperformed Kacetate in reducing volatility of a dicamba plus glyphosate mixture (FIGS. 8-10). A 0.015 molar concentration of Kborate was comparable to 0.05 moles of Kacetate in reducing volatility of dicamba based on injury to soybean.

Figure 11:
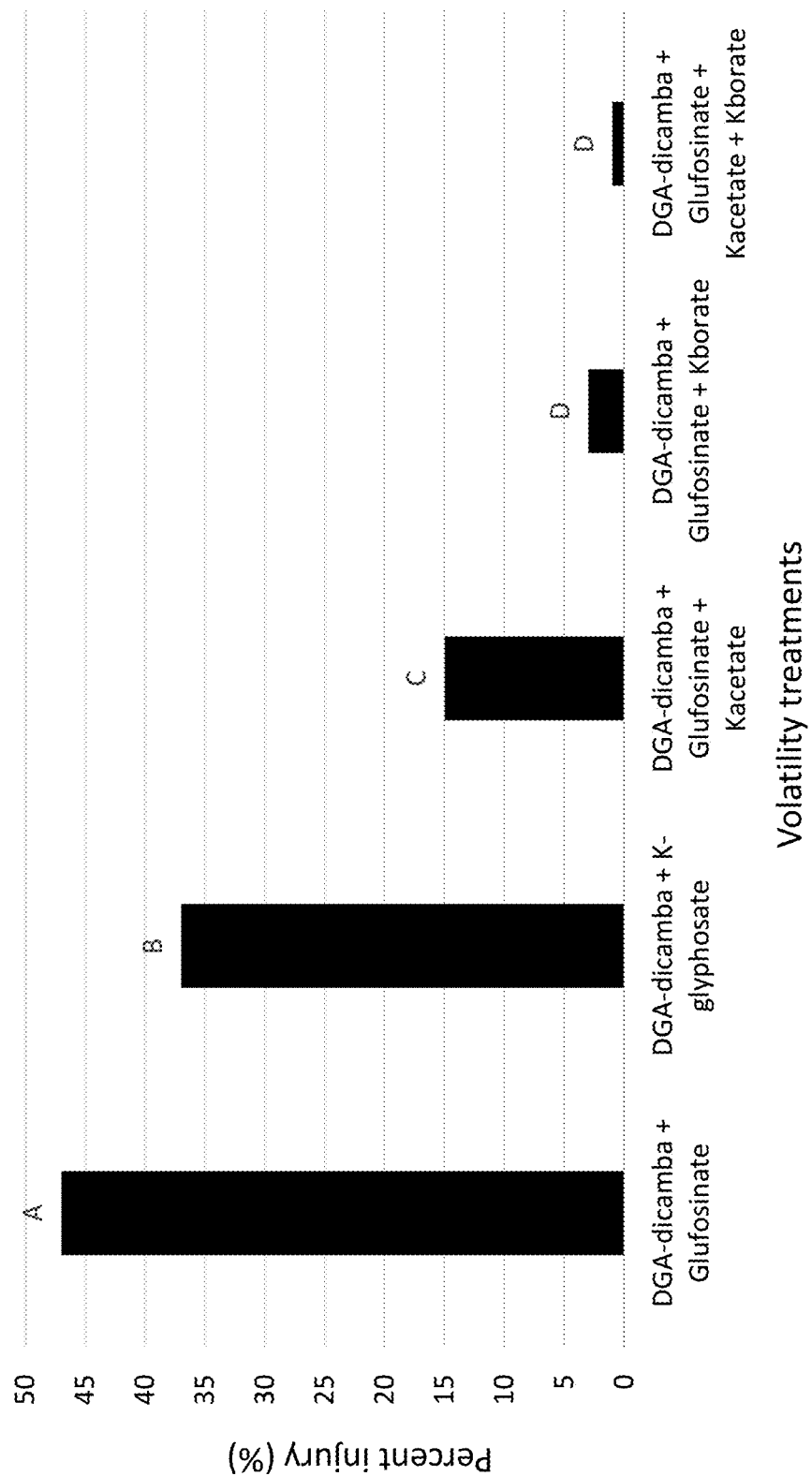
FIG. 11 shows soybean injury caused by volatilization of the diglycolamine salt of dicamba mixed with glufosinate or the potassium salt of glyphosate along with use of potassium borate and potassium acetate as volatility reducing agents averaged over eight quadrants per plot at 21 days after implementing each treatment.
Figure 12:
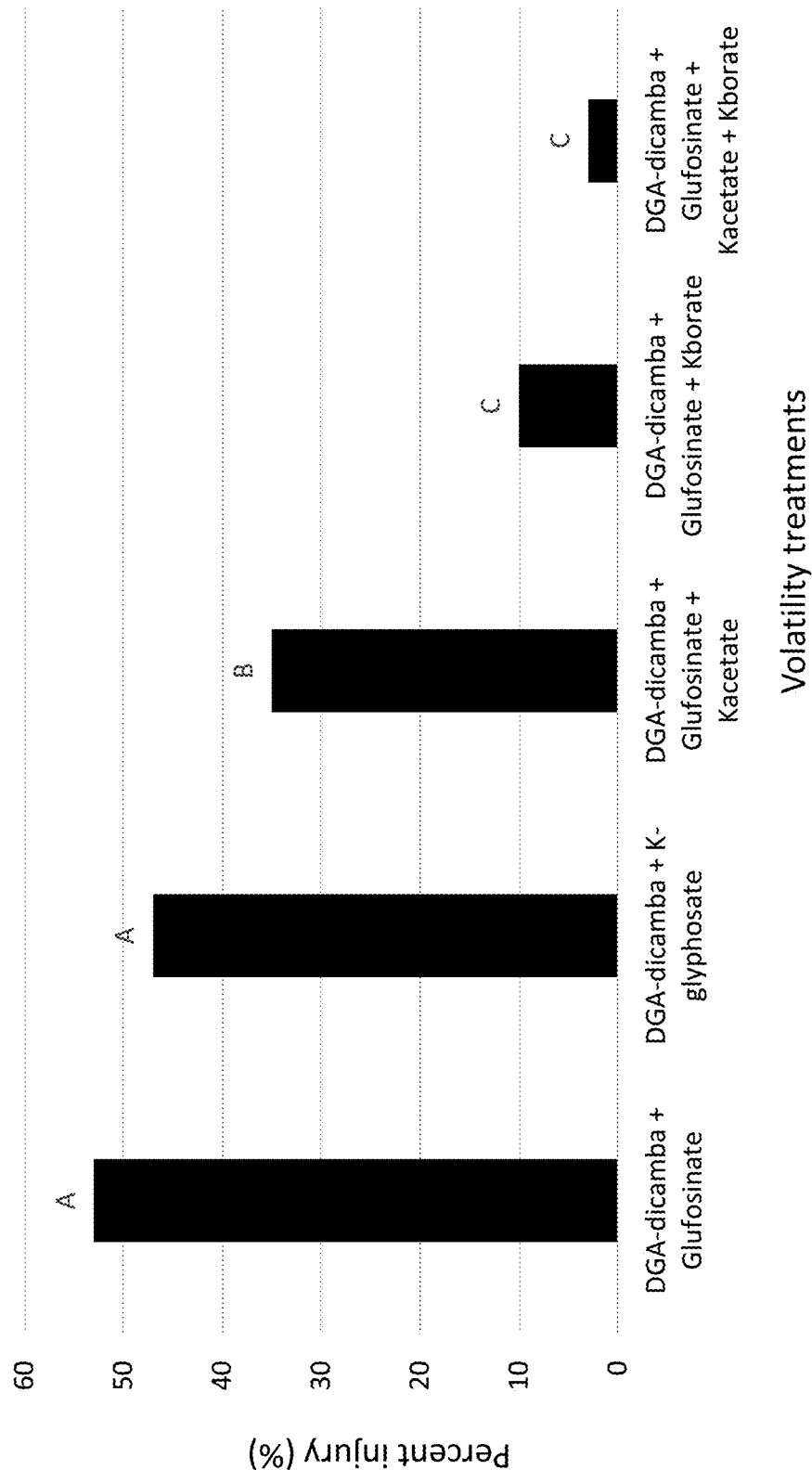
FIG. 12 shows maximum soybean injury caused by volatilization of the diglycolamine salt of dicamba mixed with glufosinate or the potassium salt of glyphosate along with use of potassium borate and potassium acetate as volatility reducing agents at 21 days after implementing each treatment.
Figure 13:
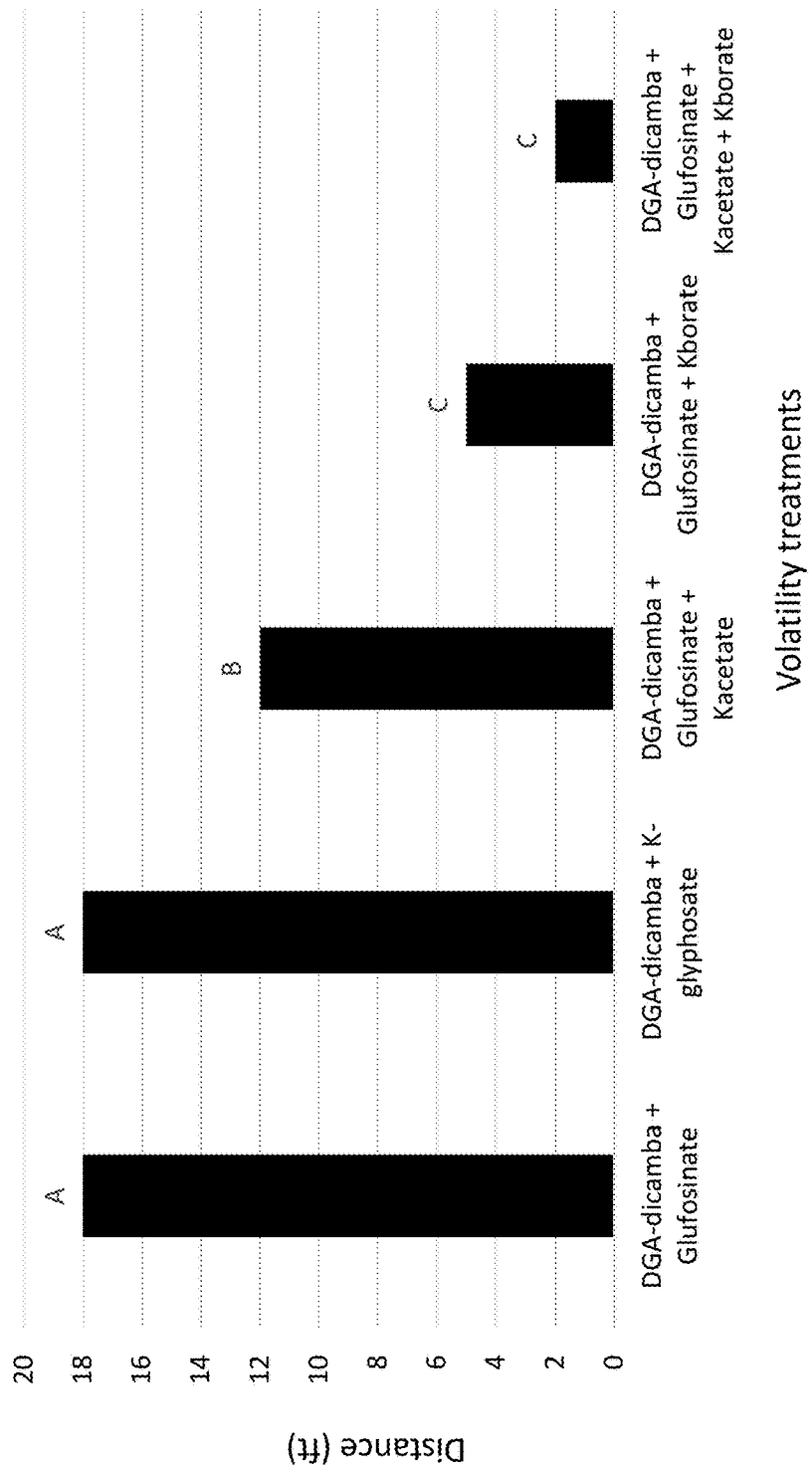
FIG. 13 shows distance from the center of each tunnel to 5% visible injury observed on soybean caused by volatilization of the diglycolamine salt of dicamba mixed with glufosinate or the potassium salt of glyphosate along with use of potassium borate and potassium acetate as volatility reducing agents at 21 days after implementing each treatment.

Mixing glufosinate with dicamba increased average visual injury in comparison to dicamba plus glyphosate (FIG. 11). The addition of Kborate to dicamba and glufosinate mixtures reduced dicamba volatility, more so than did Kacetate (FIGS. 11-13).

TABLE 1 pH of spray solutions averaged over two runs of each experiment applied at 15 gallons/acre (140 liters per hectare) of spray volume.

| Treatment | Rate or Concentration | pH |
| --- | --- | --- |
| Water | — | 7.72 |
| DGA-dicamba + K-glyphosate | 560 g ae/ha + 1260 g ae/ha | 4.52 |
| DGA-dicamba + K-glyphosate + Kborate | 560 g ae/ha + 1260 g ae/ha + 0.00625M | 5.05 |
| DGA-dicamba + K-glyphosate + Kborate | 560 g ae/ha + 1260 g ae/ha + 0.0125M | 5.40 |
| DGA-dicamba + K-glyphosate + Kborate | 560 g ae/ha + 1260 g ae/ha + 0.025M | 6.08 |
| DGA-dicamba + K-glyphosate + Kborate | 560 g ae/ha + 1260 g ac/ha + 0.05M | 7.84 |
| DGA-dicamba + K-glyphosate + Kborate | 560 g ae/ha + 1260 g ae/ha + 0.1M | 8.66 |
| Water | — | 7.51 |
| DGA-dicamba + K-glyphosate | 560 g ae/ha + 1260 g ae/ha | 4.48 |
| DGA-dicamba + K-glyphosate + Kacetate | 560 g ae/ha + 1260 g ae/ha + 0.015M | 4.77 |
| DGA-dicamba + K-glyphosate + Kborate | 560 g ae/ha + 1260 g ae/ha + 0.015M | 5.71 |
| DGA-dicamba + K-glyphosate + Kacetate | 560 g ae/ha + 1260 g ae/ha + 0.05M | 5.11 |
| DGA-dicamba + K-glyphosate + Kborate | 560 g ae/ha + 1260 g ae/ha + 0.05M | 8.30 |
| Water | — | 7.71 |
| DGA-dicamba + Glufosinate | 560 g ae/ha + 655 g ae/ha | 6.91 |
| DGA-dicamba + K-glyphosate | 560 g ae/ha + 1260 g ae/ha | 4.43 |
| DGA-dicamba + Glufosinate + Kacetate | 560 g ae/ha + 1260 g ae/ha + 0.05M | 7.24 |
| DGA-dicamba + Glufosinate + Kborate | 560 g ae/ha + 1260 g ac/ha + 0.05M | 9.12 |
| DGA-dicamba + Glufosinate + Kacetate + Kborate | 560 g ae/ha + 1260 g ae/ha + 0.05M + 0.05M | 9.08 |

*a* Abbreviations: DGA = diglycolamine salt; K = potassium salt; Kacetate = potassium acetate; Kborate = potassium tetraborate tetrahydrate

What is claimed:

1. A composition comprising an effective amount of an acidic herbicide, an effective amount of a borate, and an aqueous solvent, wherein the borate is a potassium borate salt, wherein the effective amount of the borate reduces the volatility of the acidic herbicide and the effective amount of potassium borate is less than 30 grams per liter, wherein the pH of the composition is greater than 5, and wherein the herbicide comprises a dimethlyamine (DMA) dicamba salt or a diglycolamine (DGA) dicamba salt and a second herbicide comprising glyphosate or glufosinate.

2. The composition of claim 1, wherein the effective amount of borate is a field-applied amount of 0.05 to 1.0 pounds boron per acre.

3. The composition of claim 1, wherein the acidic herbicide is dicamba (3,6-dichloro-2-methoxybenzoic acid) or an agriculturally acceptable salt or ester thereof.

4. The composition of claim 3, wherein herbicide comprises the diglycolamine (DGA) dicamba salt.

5. The composition of claim 3, wherein the second herbicide comprises a potassium salt of glyphosate or glufosinate.

6. The composition of claim 1 further comprising a borate buffering agent.

7. The composition of claim 1 further comprising an adjuvant.

8. The composition consisting essentially of the composition according to claim 1.

9. The composition of claim 1, wherein the composition is characterized by reduced injury to a crop in comparison to a second composition comprising the effective amount of the acidic herbicide and an equivalent amount of potassium acetate to the potassium borate when applied to an area having the crop therein.

10. The composition of claim 9, wherein acidic herbicide based injury is determined by injury to plants in the area of herbicide application, injury to plants at a determined distance away from the area of herbicide application, distance away from the area of herbicide application to achieve a determined level of plant injury with the herbicide application, or any combination thereof.

11. A method for preparing the composition according to claim 1, the method comprising providing the effective amount of a borate and mixing the effective amount of the acidic herbicide and the effective amount of the borate salt in the aqueous solvent thereby preparing the composition according to claim 1.

12. The method of claim 11, further comprising mixing a second herbicide, a borate buffing agent, a herbicidal adjuvant, or any combination thereof with the acidic herbicide and the borate.

13. A method for the control of a weed in a crop, the method comprising applying the composition according to claim 1 to an area having the crop therein.

14. The method of claim 13, wherein herbicidal volatilization injury to a plant outside of the application area is reduced as compared to application of the acidic herbicide without the borate.

15. The method of claim 13, wherein the crop is soybean or cotton.

16. A method for the inhibition of growth or proliferation of a weed or the killing of the weed, the method comprising applying the composition according to claim 1 to an area having the weed therein.

17. The method of claim 16, wherein herbicidal volatilization injury to a plant outside of the application area is reduced as compared to application of the acidic herbicide without the borate.

18. The method of claim 16, wherein the method controls at least one broadleaf weed.

19. A method for the increase of boron in a tissue of a crop, the method comprising applying the composition according to claim 1 to the crop, wherein the concentration of boron in the tissue of the crop as compared to an untreated crop is increased.

20. The method of claim 19, wherein the concentration of potassium in the tissue of the crop as compared to an untreated crop is increased.

* * * * *